April 26, 1966     J. L. COCKRELL ETAL     3,248,721
AUTOMATIC TESTING OF BISTATE SYSTEMS
Filed Aug. 30, 1961     5 Sheets-Sheet 1

Fig. 1

INVENTORS: JAMES L. COCKRELL
JAMES H. MAGEE
VICTOR S. UNDERKOFFLER

United States Patent Office 3,248,721
Patented Apr. 26, 1966

3,248,721
AUTOMATIC TESTING OF BISTATE SYSTEMS
James L. Cockrell, Ambler, James H. Magee, Southampton, and Victor S. Underkoffler, Doylestown, Pa., assignors to Leeds and Northrup Company, Philadelphia, Pa., a corporation of Pennsylvania
Filed Aug. 30, 1961, Ser. No. 134,971
14 Claims. (Cl. 340—253)

The present invention relates to arrangements for automatically testing bistate systems and is particularly concerned with arrangements for continuously checking the integrity of a bistate protective system in use to monitor one or more process conditions, such as temperature, flow rate, or the like, and to produce, when the magnitude of the monitored condition or conditions reaches a predetermined value, a warning signal and/or a cut-back or shut-down of the process.

In accordance with the present invention, means are provided for repeatedly generating and applying a sequence of groups of binary test signals to form in each sequence all significant signal combinations which could possibly appear as input signals for the system under test. The response of the system to each group of binary test signals is automatically compared with what the response should be for that group; if the responses do not coincide, there is produced a warning signal that a failure has occurred somewhere in the system.

The aforesaid testing arrangement is made part of a protective system utilizing redundancy to afford continued operability after a failure of at least one redundant member and provides means for prompt location of failure of any redundant member so that it may be replaced or repaired well in advance of the time in which another failure or failures may reasonably be expected. This extends the life expectancy of the system far beyond that obtainable by redundancy of any reasonable order whether it be straight parallel redundancy or voting redundancy.

In one form of the invention, it is provided that upon detection of a failure, the particular test signal group which revealed the fault is repeatedly applied and displayed to the exclusion of other groups for prompt location of the fault by observation of indicators individual to various units or circuits of the system under test.

More particularly, in the preferred protective system, the voting-redundancy circuits are utilized to provide continued operability of the system even though there is a failure therein and the repeatedly applied sequences of test signal groups also automatically check for failure of the voting ability of such circuits. The units affording voting-redundancy also have indicators individual to them so that upon occurrence of warning of a fault somewhere in the system, an observation of their display immediately informs whether or not the fault lies in the voting units or circuits.

Also in accordance with the present invention, in systems where the proper state of the output signal for any given test input combination is different for different units or groups of units, it is provided that successive sequences of the test signal groups are automatically scheduled for selective application to different units or groups and that the circuitry is correspondingly scheduled to recognize a deviation from any of the normal input vs. output patterns.

The invention also resides in automatic testing systems having features of utility and novelty hereinafter described and claimed.

For a more detailed understanding of the invention, reference is made in the following description of embodiments thereof to the accompanying drawings in which.

Figure 1:
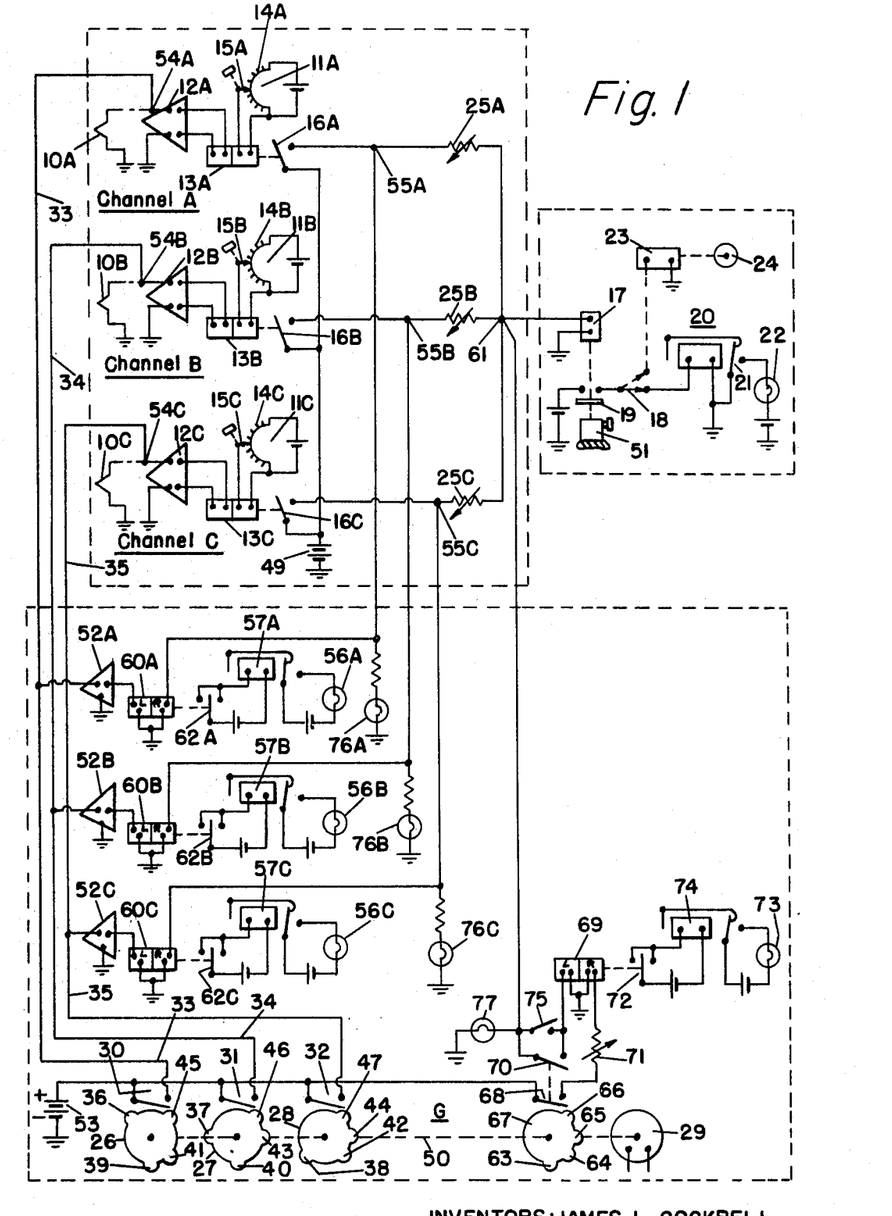
FIG. 1 schematically illustrates a relatively simple bistate protective system whose circuits and components are continuously monitored for detection of any failure impairing its reliability.

Referring to the upper portion of FIG. 1 within the dash-line rectangle, each of transducers 10A, 10B, 10C is responsive to a condition, specifically temperature, whose sense of deviation from a predetermined magnitude is to be monitored and/or controlled. For other conditions, such as pressure, rate of flow, and the like, a suitable transducer will be used. Each of the potentiometer circuits 11A, 11B, 11C is exemplary of a device for producing a reference signal corresponding with the predetermined magnitude of the condition. Specifically, each of the circuits 11A–11C includes a slidewire (14A–14C respectively) whose position relative to its contact (15A–15C respectively) is adjustable to establish the desired set point or limit. Depending upon the particular process, the transducers may all be responsive to the same condition or to different conditions. For simplicity of explanation here, it will be assumed that the transducers are thermocouples as shown and are subjected to the same temperature and have the same set points. The analog output signal of each of the condition-responsive devices 10A–10C, as amplified by a corresponding one of the amplifiers 12A–12C, is compared with its reference signal. The sensitive differential relays 13A–13C are exemplary of devices for effecting such comparisons and in each case for converting the analog unbalance to a binary signal whose two states respectively correspond with condition-magnitudes above and below the set point. Specifically, each relay is biased to open-circuit position by the current supplied to one coil by the set-point circuit and this bias is overcome by the current supplied to the other operating coil from the thermocouple signal amplifier when the temperature exceeds the set point.

The contacts 16A–16C of relays 13A–13C are in parallel paths in the input circuit of relay 17 which is exemplary of an output device which directly or indirectly indicates that the condition is above or below the set point and/or effects control of some agent or instrumentality affecting the magnitude of the measured condition. By way of example and with switch 18 in the full-line position shown, when relay 17 is energized, the resultant closure of its contacts 19 effects energization of the annunciator or latch relay 20. For repeating and retaining the information concerning the state of energization of relay 17, the relay 20 may be provided with movable contact 21 for controlling the lamp bulb 22 or equivalent indicator. With switch 18 in dotted-line position, the energization of relay 17 results in energization of electromagnet 23 to change the position of a valve, switch or other control device 24 suited to change the rate of application of an agent affecting the measured condition.

For reasons which will subsequently appear, it is assumed that by adjustment or selection of the resistance values of resistors 25A–25C respectively in series with the relay contacts 16A–16C and the associated current source 49, it can be predetermined that output relay 17 will be sufficiently energized to effect closure of its contact 19 either when any one of contacts 16A–16C is closed, or when any two of contacts 16A–16C are closed, or when all of contacts 16A–16C are closed.

With resistors 25A–25C of value such that relay 17 is energized when any of contacts 16A–16C is closed, the system becomes inoperative when any of the three signal channels A, B, C fails in its ON state. Specifically, if there is a failure in any of the three channels which causes, or corresponds with, the closed-circuit position of any one of contacts 16A–16C, the system will indicate that the temperature is above the set point regardless of whether the temperature is above or below the set point. In short, for this sense of failure (an ON state failure) the reliability of the three-channel system is less than that of one using a single signal path or channel.

With resistors 25A–25C of value such that relay 17 is energized only when all of contacts 16A–16C are closed, the system becomes inoperative when any of the three signal channels fails in the OFF state. Specifically, if there is a failure in any of the three channels A–C which prevents, or corresponds with, the open-circuit position of any one of contacts 16A–16C, the system will indicate the temperature is below the set point regardless of whether the temperature is above or below the set point. The redundancy of signal paths or channels has degraded the reliability of the system for this sense of failure (an OFF state failure) because the increased number of components required by the multiple paths has increased the possibility of failure within a given life expectancy of the system.

By adjustment or selection of the values of the summing resistors 25A–25C, it can be predetermined that relay 17 will be sufficiently energized to effect closure of its contact 19 only when any two or more of the contacts 16A–16C are closed. In this case, the system remains operable to produce a binary output validly representative of the sense of the difference between the set point and the existing magnitude of the measured condition even though there is a failure in either sense in any one of the three-signal channels. In other words, in this case the three-channel system utilizes a voting or majority redundancy providing continued operability of the alarm or control system without false indications or responses despite a failure in either sense in any signal channel.

It can be shown that starting with a single-channel system, the maximum percentage increase in reliability is obtained with a three-channel system utilizing such voting or majority logic. Since three is the smallest number of channels in which majority voting is possible, this system may be referred to as representing first order voting redundancy. Further increase in reliability is possible by further redundancy, but the percentage increase is much less and progressively rapidly so. Use of high orders of redundancy is not economically feasible for most applications, and in any event is made unnecessary by the apparatus shown in the lower portion of FIG. 1 and now described. This apparatus provides for testing of the integrity of the three-signal channels singly and in combination quickly to indicate failure in the system and to identify which channel has failed, in either sense, to permit its prompt repair or replacement. Continued operability of the system is maintained as long as the integrity of any failed channel is restored before a failure occurs in either of the other two channels. Where there is possibility that the time before failure in two channels may not be sufficient for repair, additional repair time may be gained by recourse to a higher order of voting-redundancy: for example, five channels with three being a majority vote.

In FIG. 1, the cams 26, 27, 28 driven by motor 29 and respectively associated with switches 30, 31, 32 form a means G for producing bistate input signals for the three-signal channels in all possible binary-coded combinations. In the cam position shown, none of the switches 30–32 is closed and no pulses are transmitted to the three-signal channels over the test-circuit conductors. This first test signal applied to the system therefore corresponds with the binary-coded group 000. When the cam positions become such that the rise 36 of cam 26 effects momentary closure of switch 30, an input pulse is supplied to channel A over conductor 33: For this position of the cam, the switches 31, 32 are open and no pulses are supplied to channels B and C. This second test signal group applied to the system from the coded pulse generator corresponds with the binary-coded group 100. In the next cam sector, the rise 37 of cam 27 effects momentary closure of switch 31 and switches 30, 32 are open. Thus, a pulse is applied to the input of channel B over conductor 34 and no pulse is applied to either of channels A and C. This third test signal group supplied to the system therefore corresponds with the binary-coded group 010. In the next cam sector, the rise 38 of cam 28 effects momentary closure of switch 32 with switches 30, 31 open so that a test pulse is supplied only to channel C. This fourth test-signal group therefore corresponds with the binary-coded group 001. For the next cam sector, the switches 30 and 31 are closed by the rises 39, 40 of cams 26, 27 and switch 32 is open so that test pulses are applied to the input circuits of channels A and B. This fifth group of test signals corresponds with the binary-coded group 110. For the next cam sector, the switches 30 and 32 are closed by the rises 41, 42 of cams 26 and 28. Thus, input pulses are applied to the channels A and C and no pulse is applied to channel B so to form a sixth input pulse group corresponding with the binary coding 101. For the next cam sector, the switches 31 and 32 are closed by rises 43, 44 of cams 27 and 28. Thus, the pulses applied to channels B and C with no pulse applied to channel A form a seventh input pulse group having the binary coding 011. For the last cam sector, the switches 30, 31 and 32 are respectively closed by the rises 45, 46 and 47 of cams 26, 27, 28. These pulses as applied to input terminals of all three channels form the eighth different input pulse group and have the binary coding 111. The 000 group is repeated between each of the other different codings.

Thus, for each test cycle, corresponding in FIG. 1 with a revolution of the cam shaft 50, there is applied to the inputs of the three-signal channels A, B, C a series of test signals coded to embrace all possible combinations of bistate inputs for those channels.

The application of these test signals does not disturb the system because the duration of each tet group of pulses is less than the response time of the output relay 17. The delayed response characteristic of relay 17 may be obtained by a dash-pot 51, as illustrated, or by other equivalent means.

The remainder of the description of FIG. 1 is primarily concerned with those components of the test arrangement which in each of its successive cycles checks whether or not there results the proper bistate output signal for each of all of the possible combinations of bistate input signals.

Each of the relays 60A–60C and the associated circuitry is exemplary of means for comparing the bistate output signal of each individual channel with the bistate signal supplied to its input terminal and for providing an indication whether or not the output signal is of the state it should be for the state of the input signal. The contacts 62A–62C of relays 60A–60C are each in open-circuit position when both coils L, R of that relay are energized and are in closed-circuit when only one or the other of coils L, R is energized.

The L coils of relays 60A–60C are respectively connected to conductors 33, 34, 35 through amplifiers 52A–52C. Thus, the L coil of relay 60A is momentarily further energized each time switch 30 is closed to apply a test pulse from source 53 to input terminal 54A of channel A which is also normally continuously energized to extent determined by the output of the thermocouple 10A; the L coil of relay 60B also is momentarily further energized each time switch 31 is closed to apply a test pulse to input terminal 54B of channel B; and the L coil of relay 60C is similarly momentarily further energized each time switch 32 is closed to apply a test pulse to input terminal 54C of channel C.

The R coils of relays 60A–60C are respectively connected to the output terminals 55A–55C of the individual channels A–C for selective energization from source 49 when the corresponding one of the relay contacts 16A, 16B, 16C is closed.

First assuming that all channels are each operative to produce output current when the measured temperature is above the set point, all contacts 62A–62C of relays 60A–60C remain in their open-circuit position throughout the test cycle because in this case the L, R coils of each relay are both energized.

It is now assumed that one of the channels, for example channel A, has failed while the thermocouple 10A is applying to input terminal 54A a voltage corresponding with a temperature below the set point. If the nature of the failure is such that the contact 16A is continuously in open-circuit position, the failure is indicated when during the test cycle any one of the test signals 100, 110, 101, 111 is applied to the input terminals of the system. For each of these test groups, there is applied to the input terminals 54A of channel A and to the L coil of relay 60A a signal corresponding with temperature above set point. Since, however, with contact 16A in open-circuit position the coil R of relay 60A is not energized, the relay contact 62A moves to closed-circuit position. The resultant excitation of indicator 56A via latching relay 57a is indicative of a failure of channel A. Also, as later described, a failure in channel A under the stated conditions will be shown by indicator 73 upon application of test groups 110, 101.

Still assuming that the thermocouple 10A is supplying to channel A an input signal corresponding with a temperature below the set point but that the nature of the failure is such that contact 16A is in closed-circuit position, such failure is indicated during application of any one of the test signal groups 000, 010, 001, 011 to the input terminals 54A–54C of the system. For each of these test groups, the L coil of relay 60A is not energized but its R coil is energized. The resultant closure of contact 62A of relay 60A and excitation of indicator 56A is indicative of a failure of channel A. Also as later described, a failure in channel A under these stated conditions will be shown by indicator 73 upon application of test groups 010, 001.

From the foregoing, it will be understood that with thermocouple 10B applying to channel B an input signal corresponding with temperature below set point, any failure of such nature that contact 16B is in open-circuit position is indicated during application of any of the test groups 010, 110, 011, 111 and that any failure of such nature that contact 16B is in closed-circuit position is indicated during application of any of the test groups 000, 100, 001, 101. If failure in either sense occurs, the relay 60B responds to change the state of the indicator 56B.

Also from the foregoing, it will be understood that with thermocouple 10C applying to channel C an input signal corresponding with temperature below set point, any failure of such nature that contact 16C is in open-circuit position is indicated during application of any one of the test groups 001, 101, 011, 111 and that any failure of such nature that contact 16C is in closed-circuit position is indicated during application of any one of the test groups 000, 100, 010, 110. Also as with channel A, a failure in either of channels B, C results in change of state of indicator 73 as later described.

Thus, in each test cycle, it is determined whether any of the channels A, B, C has failed in either its OFF state or its ON state for magnitudes of the measured condition below the set point.

For magnitudes of temperature or other measured condition above set point, all of the L coils of relays 60A–60C are energized. Under this state of temperature, all of the contacts 16A, 16B, 16C should be closed as was checked by application of the test group 111 before the temperature rose to the set point. Furthermore, if at any time the temperature as measured by any one of the thermocouples 10A to 10C rises to the set point and the corresponding relay 13A, 13B or 13C fails to effect closure of its contact 16A, 16B or 16C, the resultant energization of relay 60A, 60B or 60C is effective to turn ON the failure-indicator 56A, 56B or 56C of the failed channel.

In the test system thus far described, the integrity of the three individual signal paths or channels of the system has been checked for all possible combinations of input signals. By selecting the magnitude of the pulse excitation relative to the continuous energization provided by the thermocouple, it is additionally possible by the arrangement described to produce an indication when a thermocouple has failed. With the system utilizing voting or majority logic, it remains operative so long as at least two of the three channels remain operative to provide sufficient energization for operation of output relay 17 of the system. Therefore when any one of the indicators 56A, 56B, 56C indicates a failed channel, that channel should be promptly replaced or repaired to preserve the high reliability afforded by simple 2 out of 3 majority logic combined with the comparison of the inputs and outputs of the channels for all possible combinations of input signals.

There is now described the remaining portion of FIG. 1 which checks the operability of the system up to relay 17, including the capability of the system to combine the outputs of the individual channels in accordance with voting or majority logic. The rises 63, 64, 65, 66 of cam 67 close the switch 68 for test-input groups 110, 101, 011 and 111 to supply a current pulse from source 53 to the R coil of relay 69. The L coil of relay 69 is connected to the common sum-output terminal 61 of channels A, B and C via the switch 70 which is closed in synchronism wtih switch 68. The current to the R coil of relay 69 is adjusted as by resistor 71 so that the relay contact 72 remains in open-circuit position unless the current concurrently supplied to coil L of relay 69 is less than the proper output current of at least two of the channels A, B, C. Thus, if during application of any of the last-specified test signals the relay contact 72 closes to excite the indicator 73 via latching relay 74, a warning is given that the system is no longer capable of utilizing voting or majority logic because of a failure in the OFF state of at least one of channels A, B, C or because of maladjustment or failure in the summing circuitry. If the fault lies within an individual channel, that fact is shown by the corresponding one of the indicators 56A, 56B, 56C: if those indicators do not indicate a channel fault, the loss of system voting ability lies in the summing circuitry between the output terminals 55A, 55B, 55C of individual channels and the system output terminal 61.

With the switch 70 disabled or replaced by switch 75 or equivalent connection and with the current to coil R adjusted as later described, the indicator 73 provides a warning upon occurrence of a fault anywhere in the system, i.e., either upon a failure in either sense in any one of channels A, B, C or upon a failure in either sense in the voting circuitry. For this mode of operation, the current to the R coil is adjusted, as by resistor 71, so that the pull-in effect of coil R is substantially equal and opposite to that of coil L as energized by the output of all three channels A, B, C concurrently in the ON state. In such case, the relay contact 72 is in open-circuit position and the pull-in characteristic of relay 69 is such that contact 72 remains in such position unless the pull-in effect of either one of coils L, R exceeds that of the other one by a difference in energization equivalent to the energization produced by the current from two channels. Thus, with switch 68 closed during application of each of the input test groups 110, 101, 011 and 111 and with all of channels A, B, C in operative condition, the contact 72 remains in open-circuit position and indicator 73 remains in its unchanged state. If, however, any one of the channels has failed in the OFF state, such failure causes a change in state of the warning signal 73 during application of the test groups 110, 101 and 011. For example, if channel A has failed, then when either of the test inputs 110 or 101 is applied, the resultant difference between the pull-in effects of coils L and R is sufficiently great to close contact 72 and to effect energization of alarm 73. An operator or maintenance man so warned of a failure somewhere in the system can by observation of indicators 56A, 56B, 56C determine in which individual channel the failure has occurred and can thus quickly restore the system to its original voting-redundancy.

Proper functioning of the composite system including the pulse generator G and associated circuitry is continuously checked by the indicator bulbs 76A, 76B, 76C and 77. The indicators 76A, 76B, 76C are connected respectively to the output terminals 55A, 55B, 55C of channels A, B, C and indicator bulb 77 is connected to the common output terminal of all channels. So long as test pulses are applied to the inputs of the channels and ON inputs are produced thereby, the indicator bulbs 76A, 76B, 76C and 77 will all be blinking. If all of them stop blinking, it is almost certain to be because of a failure in the generation or distribution of the test input pulses because the probability of a concurrent failure in the OFF state of all channels is quite remote.

If only one of the indicators 76A–76C stops blinking and remains ON, it indicates failure in the ON state of the corresponding channel whereas if it remains OFF, a failure of the corresponding channel in the OFF state is indicated. For either continuous state of any of indicators 76A–76C, the other indicator 56A, 56B or 56C of the same channel should be ON. If there is not such agreement, the indicators and indicator circuitry of that channel require checking by the maintenance man.

If only the indicator 77 of the group 76A–76C, 77 stops blinking and remains OFF, the continuity of the connections from the relay 69 to the common output and the integrity of indicator 77 are suspect since the probability of concurrent failure of all the summing circuits is quite remote. Indicator 73 should respond to failure in the summing circuits and this should serve to resolve whether the fault is in the summing circuits or the indicator 77.

Thus, in FIG. 1 the indicator 73 warns of a failure somewhere in the system and the indicators 56A–56C, 76A–76C and 77 are for quickly pin-pointing the location of the failure so that a repair may be effected during continued operability of the system to effect energization of relay 17 or equivalent system output device when the measured condition exceeds the set point.

Figures 2, 3:
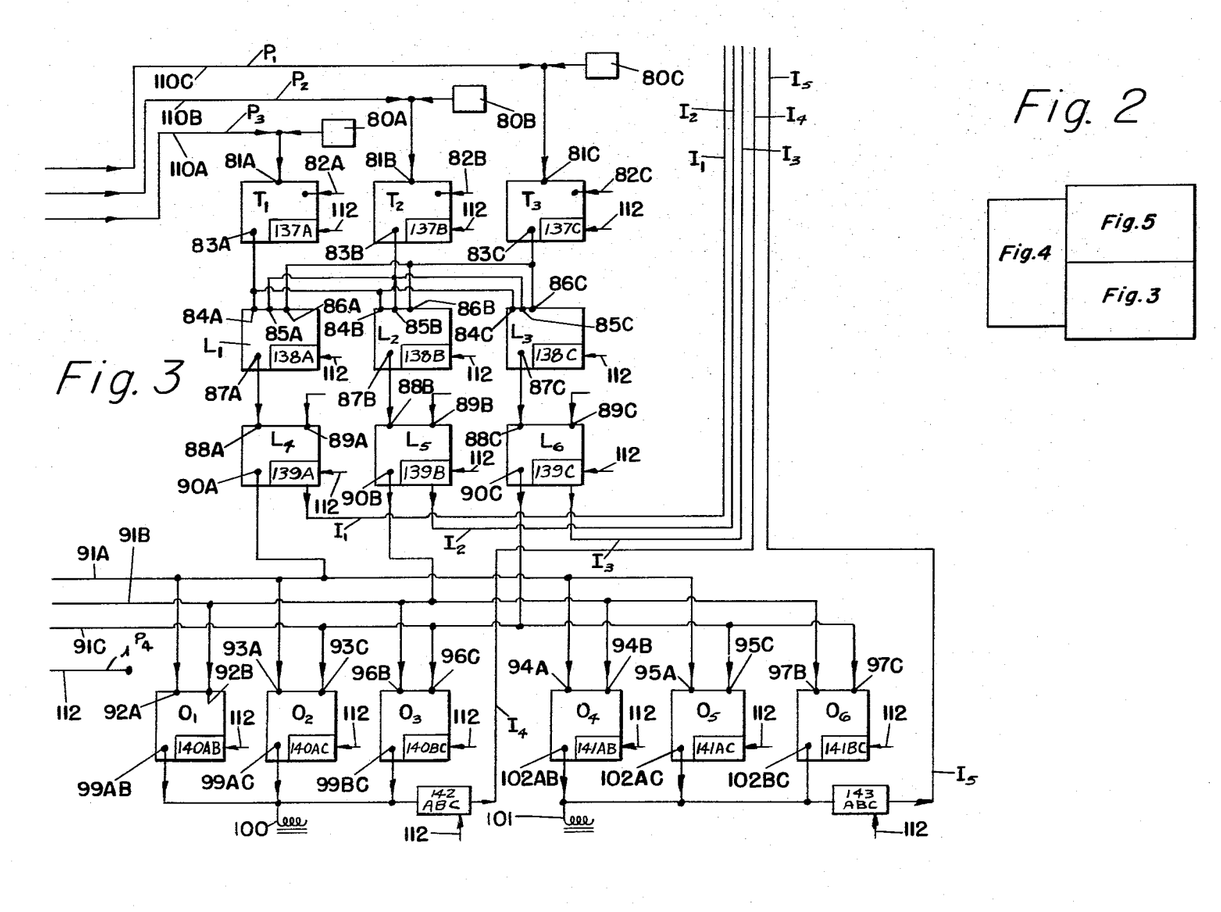
FIG. 2 shows the proper relative positions of drawing sheets 2, 3 and 4 for proper interconnection with the circuitry shown in FIGS. 3, 4 and 5.
FIG. 3 schematically illustrates a relatively complex protective system with interconnections for the circuitry of FIGS. 4 and 5.
Figure 4:
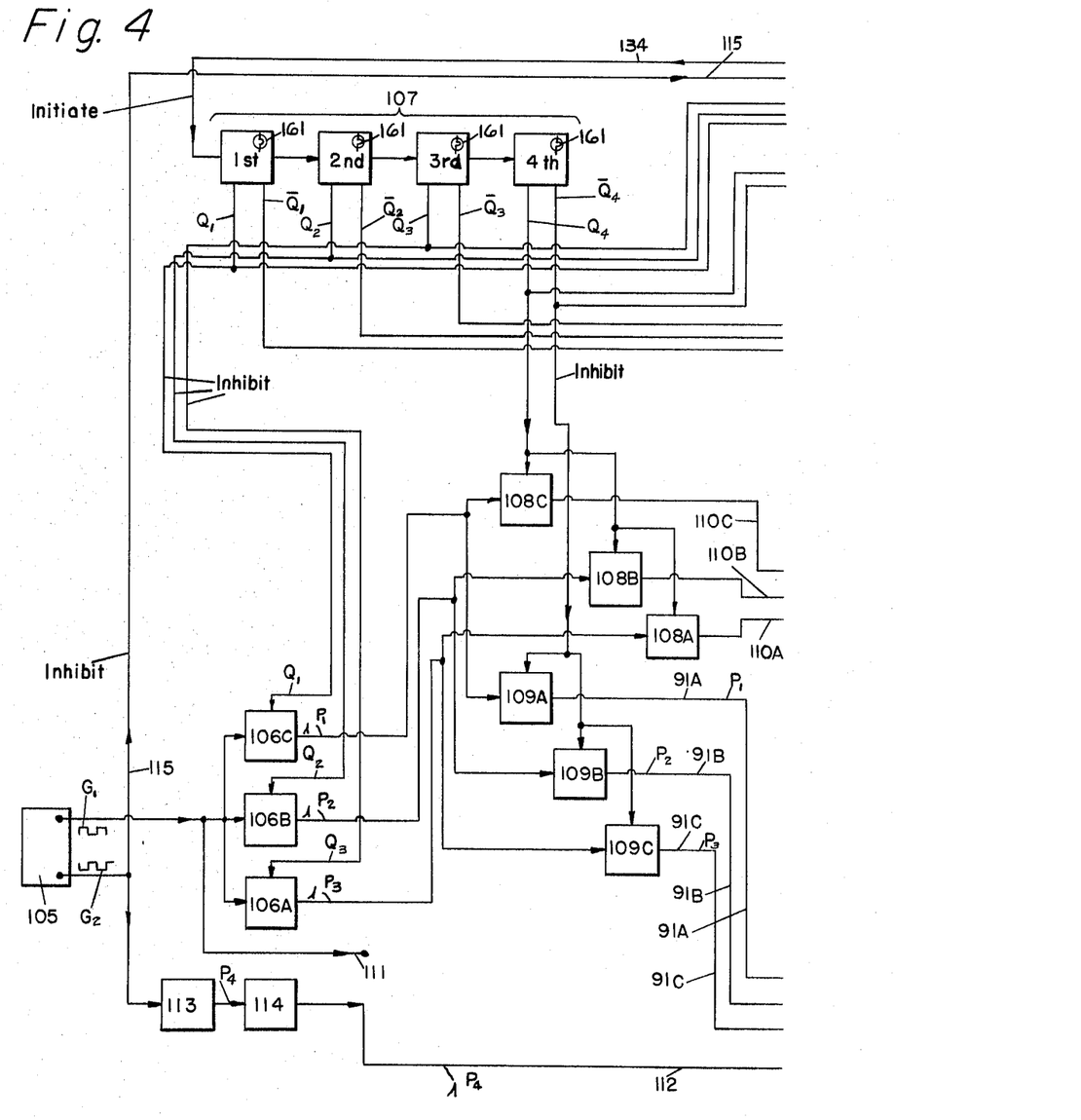
FIG. 4 schematically illustrates a solid state system for generating and distributing binary-coded test signals and includes interconnections for the circuitry of FIGS. 3 and 5.
Figure 5:
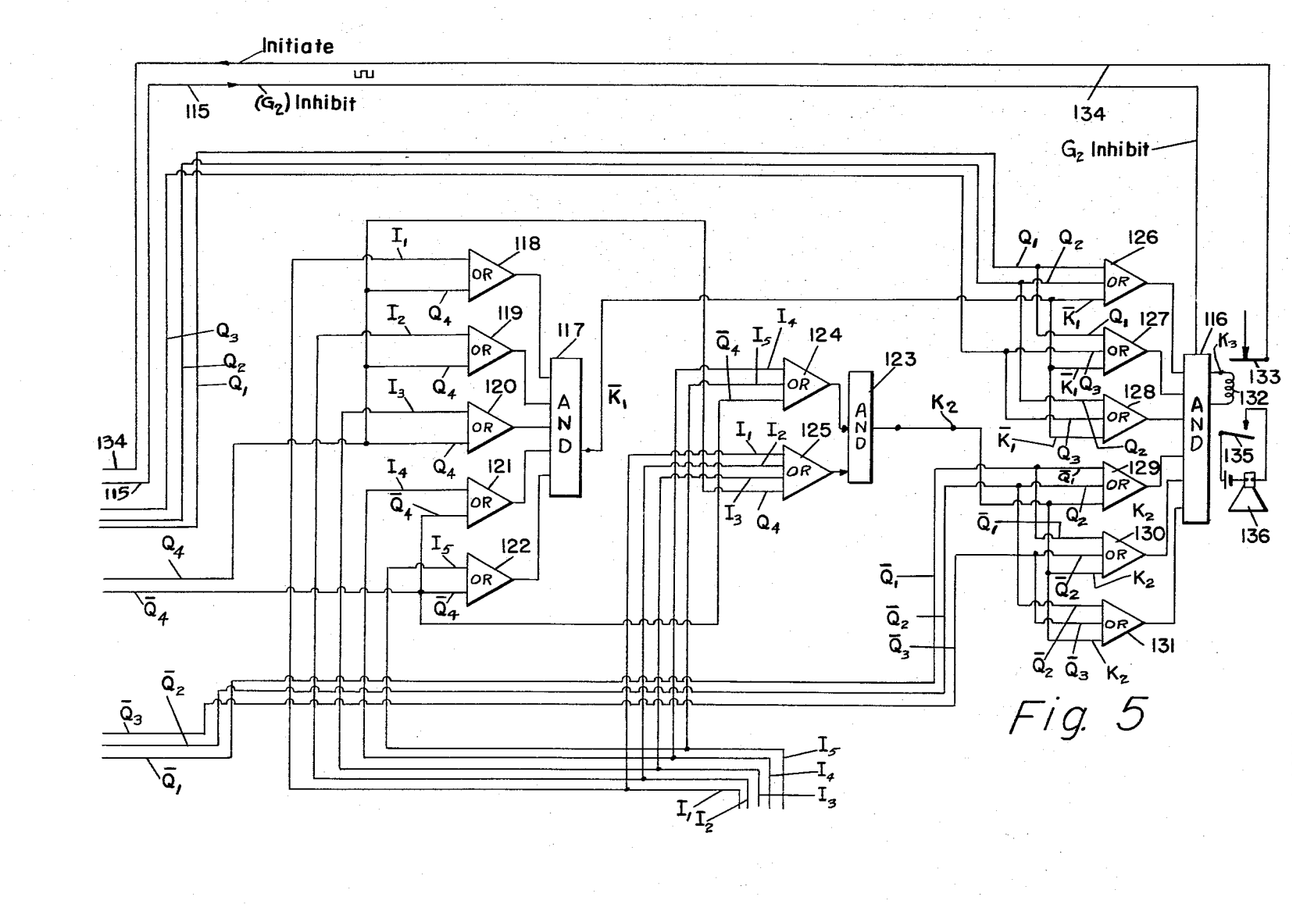
FIG. 5 schematically illustrates logic circuits for controlling a warning signal means and includes interconnections for the circuitry of FIGS. 3 and 4.

The composite operating and testing system shown in FIGS. 3, 4 and 5 is in most respect generically similar to that of FIG. 1 in that it provides a high degree of reliability attained by voting-redundancy combined with the ability to locate and to correct failures. Although not limited thereto, this system is suited to drop control rods of a nuclear reactor upon inception of a "scram" condition. The transducers 80A, 80B, 80C (FIG. 3) are all responsive to the same parameter. As will be later more fully described, the integrity of all signal channels and of all voting circuitry is checked every few seconds so that immediate warning is given of any failure in the rod-control system exclusive of the transducers or primary elements and the drop-out coils. Also, and as in the system of FIG. 1, indicators are provided for identifying the location of a faulty operating unit or signal channel. The system of FIGS. 3 to 5 has the additional feature of stopping the test cycle on the test-pulse group which revealed the fault and of repeating that group until the fault is corrected. Immediately upon correction of the fault, the test cycle is automatically resumed.

Each of the input units $T_1$, $T_2$, $T_3$ includes solid state components for comparing the transducer signal with a set-point signal and for producing an ON signal when the measured condition exceeds the set point. The transducer signals are supplied to input terminals 81A, 81B, 81C of the units: the set-point signals are supplied to input terminals 82A, 82B, 82C of the units: and the bistate output signals appear at terminals 83A, 83B, 83C of the units. Specifically in each of units $T_1$–$T_3$, the transducer and set-point signals may be supplied to windings of a magnetic amplifier whose analog output is fed to a bistable transistor switch or flip-flop. The switch output may be amplified to provide a suitably high level bistate output of the unit.

The bistable outputs of the three input units $T_1$, $T_2$, $T_3$ are supplied to each of the voting circuit logic units $L_1$, $L_2$, $L_3$. Specifically, the output terminal 83A of input unit $T_1$ is connected to the input terminals 84A, 84B, 84C respectively of the three voting units: the output terminal 83B of input unit $T_2$ is connected to the input terminals 85A, 85B, 85C of the voting units: and the output terminal 83C of input unit $T_3$ is connected to the input terminals 86A, 86B, 86C of the voting units. Assuming no failure in any of the voting-redundancy units $L_1$, $L_2$, $L_3$, each of them will produce an ON signal at output terminals 87A, 87B, 87C when at least two of the input units $T_1$, $T_2$, $T_3$ produces an ON output signal during application to the input terminals 81A, 81B, 81C of that part of the binary test-signal sequence discussed in connection with FIG. 1 in which two or three pulses are involved. It is not necessary to show the internal circuitry for the voting units as it may comprise a simple conventional two-level gating circuit similar to the logic circuit 179 of FIG. 6D.

The outputs of the voting units 87A, 87B, 87C are respectively fed to the input terminals 88A, 88B, 88C of the logic units $L_4$, $L_5$, $L_6$, each of which solves the system logic problem. For example, to another set of input terminals 89A, 89B, 89C may be fed the outputs of a similar arrangement of voting units, input units and transducers responsive to another process condition which may be the rate of flow of cooling water for the reactor. For simplicity of discussion here, the system logic problem considered is that if either of these two process conditions exceeds its set point, an ON signal appears at the output circuit terminals 90A, 90B, 90C of the units $L_4$, $L_5$, $L_6$ for ultimate release of the control rods.

The output of unit $L_4$ is applied via the bus 91A to input terminals 92A, 93A, 94A, 95A of the output units $O_1$, $O_2$, $O_4$, $O_5$, respectively. The output of unit $L_5$ is applied via bus 91B to input terminals 92B, 96B, 94B and 97B of the units $O_1$, $O_3$, $O_4$, $O_6$, respectively. The output of unit $L_6$ is applied via the bus 91C to the input terminals 93C, 96C, 95C and 97C of the units $O_2$, $O_3$, $O_5$, $O_6$, respectively.

Each of the output units $O_1$ to $O_3$ may comprise two normally ON transistor switches effectively in series to control supply of power to one of the output terminals $99_{AB}$, $99_{AC}$, $99_{BC}$. The ON output of any one of these final units $O_1$ to $O_3$ sufficiently energizes the drop coil 100 to maintain the control rods of the reactor in normal operating position with but a single output energized. However, each of units $O_1$ to $O_3$ is turned off if either of its inputs goes to the ON state so that it should be apparent if an ON state signal appears on any two or more of the busses 91A, 91B, 91C that all of the units will be turned OFF. When such TURN-OFF is effected by the test pulses—whose duration is only of the order of 100 microseconds—the control rods are not released because the mechanical response of the control rod system requires an interval of about one millisecond. When, however, the TURN-OFF continues for a period of the order of a millisecond, as occurs when at least two of the transducer signal paths, from $T_1$, $T_2$, $T_3$, for example, pass a signal indicating that the set point has been reached or exceeded, a prolonged ON signal appears at both input terminals of units $O_1$–$O_3$. Consequently, coil 100 is deenergized and the control rods drop.

The group of output units $O_4$, $O_5$, $O_6$ is similar in composition, connections and purpose to the output units $O_1$, $O_2$, $O_3$ and similarly control the coil 101 connected to their output terminals $102_{AB}$, $102_{AC}$, $102_{BC}$ and whose change in state may be used to release a control rod or to actuate a safety valve.

From all of the foregoing, it should be clear that the control-rod operating system of FIG. 3 comprises two electronic sub-systems each utilizing "two-of-three" voting-redundancy logic for high reliability and continued operability so long as there are at least two paths for transmission of true information concerning the relation between set point and a measured condition.

The circuitry shown in FIG. 4 and now described is for generating and distributing binary-coded test input signals such as discussed in connection with FIG. 1 and is generally a high-speed, solid-state equivalent of the pulse generator G of FIG. 1 which uses mechanical switches operated by code wheels or cams. The repetition-rate generator 105 is a continuously running multivibrator which produces two trains of gating pulses $G_1$ and $G_2$ dephased by 180°: The time interval between the leading edges of two successive pulses in each train may be about two seconds with each pulse of about one second duration.

The gating pulses $G_1$ are applied to the three one-shot multivibrators 106A, 106B, 106C or equivalent pulse generators, each of which unless inhibited by a signal from the first three stages of pulse-counter 107, produces upon triggering by the leading edge of a pulse $G_1$, a sharp pulse of about 100 microseconds duration. As later described in connection with FIG. 5, an Initiate signal for the four-stage pulse-counter 107 is applied to the input stage if no failures are detected after application of a test group of input signals.

With the $Q_1$–$Q_3$ outputs of the counter 107 in the O output state, none of the pulse generators 106A–106C is inhibited and the application to them of a gating pulse $G_1$ produces a group of pulses $P_1$, $P_2$, $P_3$ providing the test group 111. The next Initiate signal turns ON the first stage of the counter so that its $Q_1$ output inhibits pulse generator 106C. The following gating pulse $G_1$ is therefore effective to trigger only the pulse generators 106A, 106B to produce pulses $P_2$, $P_3$ providing the test group 011. The following Initiate signal turns OFF the first stage whose change in state turns ON the second stage whose $Q_2$ output inhibits the pulse generator 106B. The next gating pulse $G_1$ is therefore effective to trigger only the pulse generators 106A and 106C.

The resulting pulses $P_1$, $P_3$ provide the test group 101. It can similarly be shown that the next five Initiate signals by action of the binary counter 107 change the Inhibit signal pattern applied to the pulse generators 106A–106C to complete all eight possible binary combinations shown by Table A below.

TABLE A

| Initiate | Counter 107 | | | Pulse Groups | Code |
|---|---|---|---|---|---|
| | Stage 1 | Stage 2 | Stage 3 | | |
| 1 | $\overline{Q}_1$ | $\overline{Q}_2$ | $\overline{Q}_3$ | $P_1, P_2, P_3$ | 111 |
| 2 | $Q_1$ | $\overline{Q}_2$ | $\overline{Q}_3$ | $P_2, P_3$ | 011 |
| 3 | $\overline{Q}_1$ | $Q_2$ | $\overline{Q}_3$ | $P_1, P_3$ | 101 |
| 4 | $Q_1$ | $Q_2$ | $\overline{Q}_3$ | $P_3$ | 001 |
| 5 | $\overline{Q}_1$ | $\overline{Q}_2$ | $Q_3$ | $P_1, P_2$ | 110 |
| 6 | $Q_1$ | $\overline{Q}_2$ | $Q_3$ | $P_2$ | 010 |
| 7 | $\overline{Q}_1$ | $Q_2$ | $Q_3$ | $P_1$ | 100 |
| 8 | $Q_1$ | $Q_2$ | $Q_3$ | None | 000 |

These coded pulse groups are identifiable by the display of the indicator bulbs 161 of the counter stages and are supplied to the transistor switches 108A, 108B, 108C which if not inhibited respectively pass their input pulses $P_3$, $P_2$, $P_1$. As will now be explained, the inhibiting signals for these switches are produced by the fourth stage of the pulse-counter 107. For eight cycles of the pulse-counter 107, there are produced the eight test-groups of Table A with the fourth stage of the pulse-counter in the ON state: for the next eight cycles, the fourth stage is in the OFF state, i.e., $Q_4=0$ and $\overline{Q}_4=1$ and another sequence of the eight test-groups is produced. With the fourth stage in the OFF state, the switches 108A–108C are not inhibited and the binary-coded pulse groups of Table A are applied to the terminals 81A, 81B, 81C of the input units $T_1$–$T_3$ of FIG. 3. Eight repetitions of this sequence of pulse groups, for brevity called Schedule #1, occur before the fourth stage of counter 107 is turned ON, i.e., $Q_4=1$ and $\overline{Q}_4=0$. For this state of the fourth stage, none of the switches 108A–108C is capable of passing the pulse groups to the input units $T_1$–$T_3$ of FIG. 3 because inhibited by the $Q_4$ output of the fourth stage.

The coded pulse groups of Table A as produced by the pulse generators 106A–106C are also applied to the transistor switches 109A, 109B, 109C which if not inhibited respectively pass their input pulses $P_1$, $P_2$, $P_3$. With the fourth stage of counter 107 in the ON state ($\overline{Q}_4=0$), the switches 109A–109C are not inhibited and a sequence of the binary-coded pulse groups of Table A are applied over busses 91A, 91B, 91C to the input terminals of the final output units $O_1$–$O_6$ of FIG. 3. After eight repetitions of such sequence, for brevity called Schedule #2, the fourth stage of the counter is turned OFF and the resultant $\overline{Q}_4=1$ output inhibits all of switches 109A–109C.

Thus, the components and circuitry of FIG. 4 as so far described repeatedly alternately produce two binary-coded pluse schedules respectively applied to lines 110A, 110B, 110C as test inputs to input units $T_1$–$T_3$ of FIG. 3 and to lines 91A, 91B, 91C as test inputs for the final output units $O_1$–$O_6$ of FIG. 3. As later described, the $G_1$ output pulses of the repetition-rate generator 105 of FIG. 4 are also applied to line 111 to provide gate pulses for failure-indicators I which preferably are of type shown in FIG. 6. All of the indicators are reset by pulses $P_4$ as appearing on line 112 and derived from the $G_2$ output pulses of the timing-pulse generator 105; specifically, the leading edge of each of the $G_2$ pulses is effective to trip the one-shot multivibrator or pulse generator 113 to generate a short pulse passed by the transistor switch 114 to its output line 112. The $G_2$ pulses are also applied to line 115 as inhibit pulses for the final AND gate 116 of FIG. 5.

Referring now to FIG. 5, the AND gate 117 produces a $\overline{K}_1=0$ output when all of its five input circuits are enabled by the associated OR circuits 118–122. For test Schedule #1, two of these OR gates (121, 122) pass the $\overline{Q}_4=1$ output of pulse-counter 107 continuously to enable the corresponding two input circuits of AND gate 117. So long as no failure has occurred in the signal channels from input terminals 81A, 81B, 81C (FIG. 3) to output terminals 90A, 90B, 90C, the pulses $I_1$, $I_2$, $I_3$ supplied to OR gates 118, 119, 120 from units $L_4$, $L_5$, $L_6$ provide a repeating pattern correlated to the different combinations of the test pulses $P_1$, $P_2$, $P_3$ applied to input terminals 81A, 81B, 81C. The normal $I_1$, $I_2$, $I_3$ pattern, and resulting outputs of AND gate 117 are shown by Table B below.

TABLE B (SCHEDULE #1)

| Pulse Group | | | OR Gates 118–120 | | | AND Gate 117 |
|---|---|---|---|---|---|---|
| $P_1$ | $P_2$ | $P_3$ | $I_1$ | $I_2$ | $I_3$ | Output |
| 1 | 1 | 1 | 1 | 1 | 1 | 0 |
| 0 | 1 | 1 | 1 | 1 | 1 | 0 |
| 1 | 0 | 1 | 1 | 1 | 1 | 0 |
| 0 | 0 | 1 | 0 | 0 | 0 | 1 |
| 1 | 1 | 0 | 1 | 1 | 1 | 0 |
| 0 | 1 | 0 | 0 | 0 | 0 | 1 |
| 1 | 0 | 0 | 0 | 0 | 0 | 1 |
| 0 | 0 | 0 | 0 | 0 | 0 | 1 |

Any deviation from the output column of Table B represents an open circuit failure in one or more of units $T_1$–$T_3$, $L_1$–$L_6$ and the output of AND gate 117 is utilized as later described, to produce a warning signal by the annunciator 136.

During the test Schedule #2, the OR gates 118, 119, 120 are turned ON by the $Q_4=1$ output signal of pulse-counter 107 continuously to enable three of the five input circuits of AND gate 117. So long as no failure has occurred in the signal channels from the busses 91A, 91B, 91C, the input pulses $I_4$, $I_5$ from the two groups $O_1$–$O_3$, $O_4$–$O_6$ of the final output units to the other two OR gates provide a repeating pattern correlated to the different combinations of test pulses $P_1$, $P_2$, $P_3$ applied to the input terminals of the final output units $O_1$–$O_6$. The normal $I_4$, $I_5$ pattern and resulting outputs of AND gate 117 are shown by Table C below.

TABLE C (SCHEDULE #2)

| Pulse Group | | | OR Gates 121, 122 | | AND Gate 117 |
|---|---|---|---|---|---|
| $P_1$ | $P_2$ | $P_3$ | $I_4$ | $I_5$ | Output |
| 1 | 1 | 1 | 1 | 1 | 0 |
| 0 | 1 | 1 | 1 | 1 | 0 |
| 1 | 0 | 1 | 1 | 1 | 0 |
| 0 | 0 | 1 | 0 | 0 | 1 |
| 1 | 1 | 0 | 1 | 1 | 0 |
| 0 | 1 | 0 | 0 | 0 | 1 |
| 1 | 0 | 0 | 0 | 0 | 1 |
| 0 | 0 | 0 | 0 | 0 | 1 |

Any deviation from the output column of Table C represents an open-circuit failure in any one or more of units $O_1$–$O_6$ and the output of AND gate 117 is utilized, as later described, to produce a warning signal by the annunciator 136.

The AND gate 123 is controlled by the two OR gates 124, 125. Throughout Schedule #1, OR gate 124 is open because of application thereto of the $Q_4=1$ output of the pulse-counter 107. So long as no failure has occurred in the signal paths from input terminals 81A, 81B, 81C, the pulses $I_1$, $I_2$, $I_3$ applied to OR gate 125 from logic units $L_4$, $L_5$, $L_6$ provide a repeating pattern correlated to the combinations of test pulses $P_1$, $P_2$, $P_3$ applied to the input terminals 81A, 81B, 81C. The normal $I_1$, $I_2$, $I_3$ pattern and resulting outputs of AND gate 123 are shown by Table D below.

TABLE D (SCHEDULE #1)

| Pulse Group | | | OR Gate 125 | | | AND Gate 123 |
|---|---|---|---|---|---|---|
| $P_1$ | $P_2$ | $P_3$ | $I_1$ | $I_2$ | $I_3$ | Output |
| 1 | 1 | 1 | 1 | 1 | 1 | 1 |
| 0 | 1 | 1 | 1 | 1 | 1 | 1 |
| 1 | 0 | 1 | 1 | 1 | 1 | 1 |
| 0 | 0 | 1 | 0 | 0 | 0 | 0 |
| 1 | 1 | 0 | 1 | 1 | 1 | 1 |
| 0 | 1 | 0 | 0 | 0 | 0 | 0 |
| 1 | 0 | 0 | 0 | 0 | 0 | 0 |
| 0 | 0 | 0 | 0 | 0 | 0 | 0 |

Any deviation from the output column of Table D represents a short-circuit failure in any one or more of units $T_1$–$T_3$ and $L_1$–$L_6$ and the output of AND gate 123 is utilized, as later described, to produce a warning signal.

Throughout Schedule #2, OR gate 125 is open (ON state) because of application thereto of the $Q_4=1$ output of pulse-counter 107. So long as no failure has occurred in the signal paths from busses 91A, 91B, 91C through the two groups $O_1$–$O_3$, $O_4$–$O_6$ of the output units, the pulses $I_4$, $I_5$ from them to OR gate 124 provide a repeating pattern correlated to the combinations of test pulses $P_1$, $P_2$, $P_3$ applied to the input terminals of the output units $O_1$–$O_6$. The normal $I_4$, $I_5$ pattern and the resulting outputs of AND gate 123 are shown by Table E below.

TABLE E (SCHEDULE #2)

| Pulse Group | | | OR Gate 124 | | Output of AND Gate 123 |
|---|---|---|---|---|---|
| $P_1$ | $P_2$ | $P_3$ | $I_4$ | $I_5$ | |
| 1 | 1 | 1 | 1 | 1 | 1 |
| 0 | 1 | 1 | 1 | 1 | 1 |
| 1 | 0 | 1 | 1 | 1 | 1 |
| 0 | 0 | 1 | 0 | 0 | 0 |
| 1 | 1 | 0 | 1 | 1 | 1 |
| 0 | 1 | 0 | 0 | 0 | 0 |
| 1 | 0 | 0 | 0 | 0 | 0 |
| 0 | 0 | 0 | 0 | 0 | 0 |

Any deviation from the output column of Table E represents a short-circuit failure in one or more of the output units $O_1$–$O_6$ and the output of AND gate 123 is utilized, as later described, to produce a warning signal by the annunciator 136.

The AND gate 116 (FIG. 5) is controlled by the six OR gates 126–131 and the $G_2$ Inhibit pulses supplied over line 115 from the timing pulse generator 105 (FIG. 4). The $G_2$ Inhibit pulses preclude the AND gate 116 from being turned ON by the OR gates 126–131 except during the time intervals in which the pulses $P_1$, $P_2$, $P_3$ are generated and distributed.

As appears from their input notations in FIG. 5, all of the upper three OR gates 126 to 128 are opened (ON state) when the output of AND gate 117 is $\overline{K}_1=1$. The first OR gate 126 of the group is also opened (ON state) each time the first stage of counter 107 produces a $Q_1=1$ output and/or the second stage of counter 107 produces a $Q_2=1$ output, i.e., whenever either the first or second stages of counter 107 is in the ON state. The second OR gate 127 of this group is also opened whenever either or both of the first and third stages of counter 107 are in the ON state to produce either or both of the signals $Q_2=1$, $Q_3=1$. The third OR gate 128 of this group is also opened when either or both of the second and third stages of counter 107 is in the ON state to produce either or both of the signals $Q_2=1$, $Q_3=1$.

As appears from their input notations, all of the three lower OR gates 129 to 131 are opened (ON state) when the output of AND gate 123 is $K_2=1$. The first OR gate 129 of this group is also opened (ON state) whenever either or both of the first and second stages of pulse-counter 107 are in the OFF state to produce either or both of the signals $\overline{Q}_1=1$, $\overline{Q}_2=1$. The second OR gate 130 of this group is also opened whenever either or both of the first and third stages of counter 107 are in the OFF state to produce either or both of the signals $\overline{Q}_1=1$, $\overline{Q}_3=1$. The third gate 131 of this group is also opened whenever either or both of the second and third stages are in the OFF state to produce either or both of the signals $\overline{Q}_2=1$, $\overline{Q}_3=1$.

In the intervals between the inhibit pulses $G_2$, the AND gate 116 remains open and its output $K_3$ as applied to relay 132 is zero so long as less than all of the OR gates 126 to 131 are open during all of combinations of $P_1$, $P_2$ and $P_3$. In such case the relay contacts 133 remain closed and the Indicator Reset pulses $P_4$ appear on the Initiate line 134 to actuate the pulse-counter 107 to provide for the continued cycling of the test-pulse combinations. Also in such case, the relay contacts 135 remain open and the annunciator 136 remains inactive or silent. In such normal situation, the pattern of the inputs to the OR and AND gates of FIG. 5 is shown by Table F below.

TABLE F (NORMAL)

| $Q_1$ | $Q_2$ | $Q_3$ | $K_1$ | $K_2$ | Output of 116—$K_3$ |
|---|---|---|---|---|---|
| 0 | 0 | 0 | 0 | 1 | 0 |
| 1 | 0 | 0 | 0 | 1 | 0 |
| 0 | 1 | 0 | 0 | 1 | 0 |
| 1 | 1 | 0 | 1 | 0 | 0 |
| 0 | 0 | 1 | 0 | 1 | 0 |
| 1 | 0 | 1 | 1 | 0 | 0 |
| 0 | 1 | 1 | 1 | 0 | 0 |
| 1 | 1 | 1 | 1 | 0 | 0 |
| 0 | 0 | 0 | 0 | 1 | 0 |
| 1 | 0 | 0 | 0 | 1 | 0 |
| 0 | 1 | 0 | 0 | 1 | 0 |
| 1 | 1 | 0 | 1 | 0 | 0 |
| 0 | 0 | 1 | 0 | 1 | 0 |
| 1 | 0 | 1 | 1 | 0 | 0 |
| 0 | 1 | 1 | 1 | 0 | 0 |
| 1 | 1 | 1 | 1 | 0 | 0 |

If there is any deviation from this pattern for any of the combinations of test pulses, the AND gate 116 is turned ON and the resulting closure of contacts 135 of relay 132 causes the alarm 136 to sound a series of interrupted blasts to warn of a failure in the system. The interruption is produced by the $G_2$ Inhibit signal on the AND gate 116 which deenergizes relay 132 when the gate is present. Inasmuch as the reset pulse appears at the leading edge of $G_2$, the pulse disappears before the contacts 133 can close and hence the pulse-counter does not receive an advance or Initiate pulse. This may be considered as an application of the failure signal to the counter 107. The pulse generators 106A, 106B, 106C, 113 and the transistor switches 108A–108C, 109A–109C thus continue to produce the pulse combiation and schedule which detected the failure. Such combination displayed by bulbs 161 of the counter stages is repeated until the fault is corrected.

From the foregoing tables and discussion, it should be obvious that the detection of a system failure by the gating circuitry of FIG. 5 represents the solution to logic design problem presented by the system of FIG. 3. Many other gating structure solutions are, of course, possible subject to the following conditions which represent the required condition for an annunciation. If on either Schedules 1 or 2 when two or more pulses are being inserted into the system, if any one or more of the indicators involved in the respective schedules do not respond, then an annunciation is required. Also if on Schedules 1 or 2 when one or less pulses are being inserted into the system, if one or more indicators involved in the respective schedules do respond, an annunciation is also required. With regard to FIG. 5, the first section including AND gate 117 shows satisfaction of the latter condition; the second section including AND gate 123 shows the solution to the former condition; and the third section including AND gate 116 combines these two in agreement with the two-of-three voting requirement.

From the foregoing example, the simplification or extension of checking and read-out means for solution of more simple or complex system logic problems by units such as $L_4$, $L_5$, $L_6$ should be evident to one skilled in the art. Also, if less than all of the binary-test group are sufficient to provide a complete check of a particular system for failure, there may be omitted those test groups which are not of significance.

Figure 6:
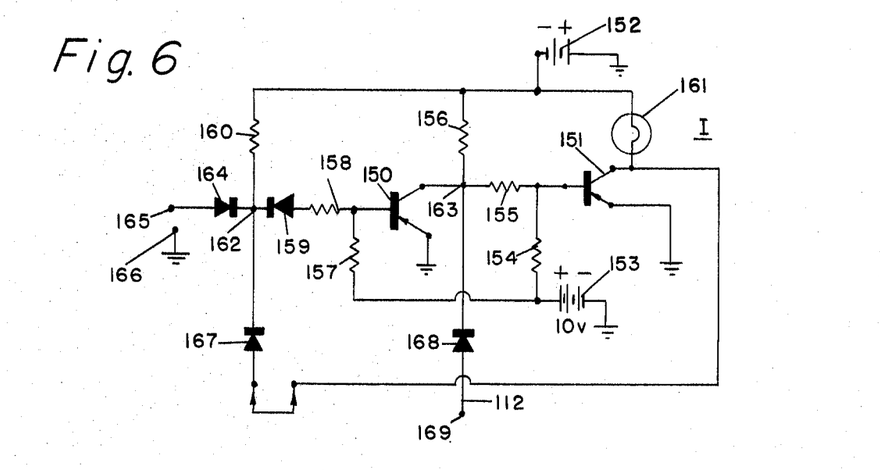
FIG. 6 is a circuit diagram of an indicator unit suited for use with the protective system units of FIG. 3.
Figure 6A:
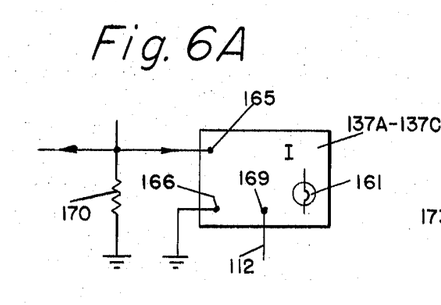
FIGS. 6A–6D show, in block, the indicator circuit of FIG. 6 with different input coupling circuits.

To facilitate speedy identification of the faulty operating unit of FIG. 3, the output of each of them is provided with a visual type of indicator unit. If no fault is detected during either Schedule #1 or Schedule #2, all of the indicators agree in display with the pulse-group signals. When, however, during Schedule #1 a fault exists in any of units $T_1$–$T_3$, $L_1$–$L_6$, the indicator of the failed unit changes its display; the repetition of the test-pulse combination which detected the fault with repeated resetting of the corresponding indicator by the reset pulses makes immediately apparent which unit has failed because its indicator does not exhibit the same display as that of the indicators respectively associated with the rest of the similar units. The indicators 137A–137C respectively associated with input units $T_1$–$T_3$ are all of the same type and a suitable form thereof is shown in FIGS. 6, 6A later described. The same type of indicator may be used as indicators 138A–138C for units $L_1$–$L_3$. The indicators 139A–139C for units $L_4$–$L_6$ are similar to one another and may also be of the form shown in FIGS. 6, 6A.

Figure 6B:
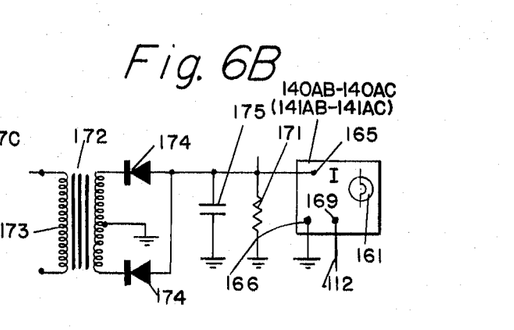

Similarly if during Schedule #2 a fault exists in any of the final output units $O_1$–$O_6$, the repetition of the test-pulse combination which detected the fault makes immediately apparent which of them has failed because its indicator does not exhibit the same display as the indicators respectively associated with the rest of these units. The indicators $140_{AB}$, $140_{AC}$, $140_{BC}$ for output units $O_1$–$O_3$ respectively are similar and a suitable form thereof is shown in FIGS. 6, 6B later described: the same type of indicator may be used as indicators $141_{AB}$, $141_{AC}$, $141_{BC}$ for output units $O_4$–$O_6$ respectively.

Figures 6C, 6D:
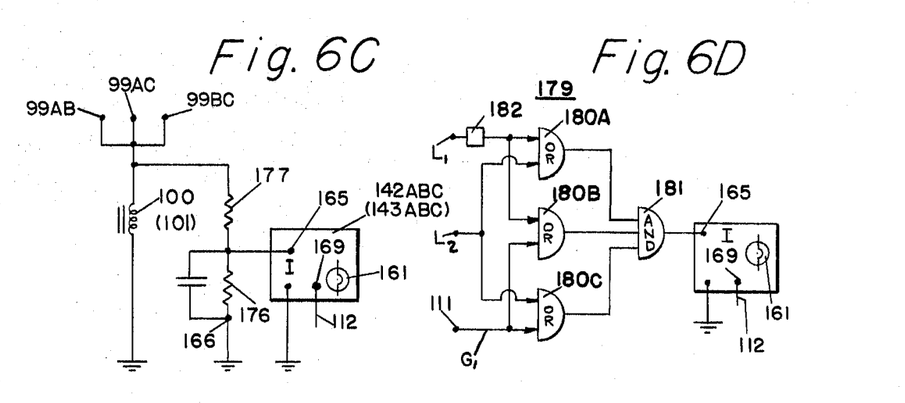

The indicator $142_{ABC}$ responsive to the output signal of units $O_1$–$O_3$ as a group and indicator $143_{ABC}$ responsive to the output signal of units $O_4$–$O_6$ as a group are similar to each other and may be of type shown in FIGS. 6, 6C later described.

The basic indicator unit I, shown in FIG. 6, is suitable for all of the foregoing indicators of FIG. 3. It comprises two PNP transistors 150, 151 which may be of General Electric type 2N241A or equivalent. The emitters of both transistors are connected to the grounded positive terminal of the negative current supply source 152 and to the grounded negative terminal of the positive current bias source 153. Each of sources 152, 153 may be 10-volt sources. The filament type indicator bulb 161 which may be General Electric type GE327 is connected from the negative terminal of source 152 to the collector of transistor 151. The resistors 154, 155, 156 connected in series between the positive terminal of source 153 and the negative terminal of source 152 provide a potential-divider circuit with the collector of transistor 150 connected to the junction of resistors 155, 156 and the base of transistor 151 connected to the junction of resistors 154, 155. Suitable values for resistors 154, 155, 156 are respectively 3300, 470 and 680 ohms. A second potential-divider circuit between the positive terminal of source 153 and the negative terminal of source 152 is provided by resistors 157, 158, diode 159 and resistor 160. Suitable values for resistors 157, 158 and 160 are 15,000, 2200 and 3300 ohms. The diode 159, as well as the other diodes later mentioned, may be the Transitron type SG701, a silicon diode. The base of transistor 150 is connected to the junction of resistors 157, 158.

In the indicator system of FIG. 6 thus far described, the point 162 in the second divider circuit is negative with respect to ground and the transistor 150 is in the ON or conductive state. With transistor 150 in such state, the point 163 in the first potential-divider circuit is near ground potential and consequently the transistor 151 is in the OFF state and reverse-biased by current source 153. With transistor 151 in the OFF state, there is no current-return path for indicator bulb 161.

Now assuming that the point 162 of the second potential-divider circuit is swung in the positive direction; for example, nearly to ground potential, as by the turning on of an external transistor between the input terminal 165, 166 or by closing of a switch so located, then the transistor 150 switches to its OFF state by virtue of the positive voltage appearing at its base due to source 153. Since diode 159 balances out the forward voltage drop across diode 164, the diode connected to resistor 158 closely approaches ground potential. In consequence, the point 163 of the first potential-divider circuit and the base of transistor 151 becomes negative with respect to ground to bias the emitter-base junction of transistor 151 in the forward direction to switch transistor 151 to the ON state. There is now provided a current path from source 152 through the indicator bulb 161.

In the indicator circuit as thus far described, the transistors 150, 151 and indicator bulb 161 revert to their original states upon discontinuance of the switching source applied to input terminals 165, 166. To hold transistors in the switched state with the bulb 161 lighted, the collector of transistor 151 is connected through diode 167 to point 162 in the input circuit of transistor 150. With this connection, upon discontinuance of the positive or ground switching source at input terminal 165, the point 162 nevertheless remains at ground potential to hold transistor 150 in the OFF state and transistor 151 in the ON state.

The indicator circuit may be reset to its original state by applying to point 169 a ground or a positive voltage through diode 168 to point 163 in the potential-divider circuit including resistors 154, 155, 156. This switches the transistor 151 to its original OFF state with the result that the indicator bulb 161 goes out. Also since the collector of transistor 151 shifted to a potential negative with respect to ground, the diode 167 is no longer effective to hold point 162 at ground potential and transistor 150 switches to its original ON state.

To use the indicator like that of FIG. 6 as the failure indicators 137A–137C, 138A–138C and 139A–139C of units $T_1$–$T_3$, $L_1$–$L_3$, $L_4$–$L_6$ of FIG. 3, the input terminals 165, 166 are connected to the output or coupling impedance of the unit—shown in FIG. 6A as resistor 170. When the output signal of the unit is in the ON state, the input terminal 165 of the indicator is 10 volts negative so that, as discussed in connection with FIG. 6, the indicator bulb 161 is deenergized. Upon change in state of the output signal of unit $T_1$ (or other unit of the group specified), the input terminal 165 goes to ground potential and the indicator bulb 161 is turned ON and remains ON until turned OFF by the next reset pulse $P_4$ supplied over line 112 to the reset terminal 169.

To use the indicator circuit I of FIG. 6 as the failure indicator for each of output units $O_1$–$O_6$ of FIG. 3, the input terminals 165, 166 of the indicator circuit may be connected to the input impedance of that circuit shown in FIG. 6B as resistor 171. The reset terminal of each of these indicators is connected to line 112 which supplies the reset pulses $P_4$. In the preferred form of these units, two high level transistor switches controlled by the input signals of the unit supply the direct-current for operation of a magnetic-transistor inverter circuit to generate alternating-current which flows in the primary winding 173 of transformer 172. The secondary current of the transformer is rectified by diodes 174 and supplied to the filter circuit exemplified by capacitor 175. Thus, so long as current is supplied to output resistor 171, the indicator bulb 161 of the associated indicator circuit is out. If a failure occurs in any of units $O_1$–$O_6$ such that output power is not supplied from it, the indicator bulb 161 of the associated one of indicators $140_{AB}$, $140_{AC}$, $140_{BC}$, $141_{AB}$, $141_{AC}$, $141_{BC}$ goes on.

To use the indicator circuit I of FIG. 6 as one of the indicators $142_{ABC}$, $143_{ABC}$ of FIG. 3, the input terminals 165, 166 of the indicator circuit are connected to resistor 176 (FIG. 6C) which is connected in series with resistor 177 to form a potential-divider across the associated rod-drop coil 100 or 101. With the current through coil 100, for example, being supplied by all of the normally ON units $O_1$–$O_3$, the voltage drop across resistor 176 is sufficient to maintain the first transistor 150 in its ON state so that the associated indicator bulb 161 is not lighted. The capacitor 178 acts as a smoothing filter for the voltage normally applied. Should all of the units of group $O_1$–$O_3$ fail to supply power, the bulb 161 of indicator unit $142_{ABC}$ will go ON; similarly, should all of the units of group $O_4$–$O_6$ fail to supply power, the bulb of indicator unit $143_{ABC}$ will go ON.

In brief summary, when the automatically controlled annunciator 136 of FIG. 5 warns an operator or maintenance man that a failure has occurred somewhere in the system of FIG. 3, observation of the indicator bulbs of the counter 107 and of the indicator units 137A–137C, 138A–138C, 139A–139C, $140_{AB}$–$140_{BC}$, $141_{AB}$–$141_{BC}$, $142_{ABC}$ and $143_{ABC}$ will at once reveal what operating unit has failed. All components of each of the operating units are preferably connected and mounted on an individual card or board so that substitution of a new unit for one that has failed is a simple plug-in operation. Thus, a failed unit can be replaced almost immediately and well within the period for which there is any reasonable possibility that the number and location of failed units will be such that the system as a whole cannot drop the control rods should reaction temperature, flow of cooling water or other monitored condition reach its set point.

In the system of FIG. 3 as above described, all of the operating units produce a single output which may be either in the ON state or in the OFF state. When any of these units is of a type concurrently producing two outputs normally of opposite state, i.e., output $L_1$ ON and output $L_2$ OFF, and when required to check the validity of both output terminals $L_1$, $L_2$ whereby these terminals must always be of opposite state, it is necessary to precede the indicator with a gating structure. What is desired of the indicator is an ON indication whenever (1) either or both terminals change state in absence of an input test-pulse group; (2) both terminals change state in the presence of an input-pulse group. Such an arrangement makes a one-to-one correspondence with the indicator previously described which observes only a single input terminal. The two outputs and gating pulses $G_1$ are applied to the input terminal 165 of indicator unit I through a logic circuit 179 such as, for example, shown in FIG. 6D. The reset pulses on line 112 may be applied to terminal 169 of the indicator. Specifically, in FIG. 6D the gating pulses $G_1$ are supplied to the OR gates 180B, 180C; the output of line $L_1$ is supplied to OR gates 180A, 180B through an inverter 182 and the output of line $L_2$ is applied to OR gates 180A, 180C. In absence of failures, the indicator light will blink during each sequence of test signals. If $L_2$ has failed in the ON state and/or $L_1$ has failed in the OFF state, the light 161 remains ON after detection of the failure and its display is not affected by the gating pulses, the reset pulses or the test pulses. If $L_1$ has failed in the ON state and/or $L_2$ has failed in the OFF state, the light 161 remains OFF and is not affected by the gating pulses, the reset pulses or the test pulses.

The indicator I shown in FIG. 6 is not herein claimed per se but is claimed in copending application Serial No. 134,972, filed August 30, 1961 as the sole invention of one of the joint inventors of the subject matter herein claimed.

For further discussion of the system including a mathematical treatment of the high reliability afforded and for photographic illustration of the various circuit unit cards, reference may be had to our paper entitled: "Nuclear Protective System Design for Reliability," appearing in the Proceedings of the Joint Nuclear Instrumentation Symposium held at North Carolina State College, September 6–8, 1961.

It shall be understood the invention is not limited to the particular arrangements illustrated and described but comprehends arrangements and methods within the scope of the appended claims.

What is claimed is:

1. An arrangement for testing a system having at least two groups of units for producing a common bistate output signal which comprises means for repeatedly generating a sequence of binary test-signal combinations which simulate all possible significant input signal combinations for said groups of units, means operating in timed relation to said generating means for selectively applying successive sequences of test-signal combinations generated by the first-named means to different groups of said units, means operating in timed relation to said second-named means for concurrently producing check signals each representing the correct input-output relation for each test-signal combination as selectively applied to the different groups of units of said system, and means for producing a failure signal whenever the actual output signal of the system for an applied test-signal group is not of proper state as represented by the concurrently produced check signal.

2. An arrangement as in claim 1 in which the last-named means is effective in event of detection of a failure repeatedly to apply the test-signal combination which revealed a failure to the group of units in which the failure was detected.

3. An arrangement as in claim 2 in which units of the different groups have individual indicators responsive to a unit failure and providing a persisting display upon repeated application of the test-signal combination which detected a failure in the system.

4. An arrangement for testing a system having at least two bistate input circuits and a bistate output circuit whose state is normally predetermined by the concurrent states of the inputs comprising means generating test signals for transmission to said input circuits, gating means for inhibiting or permitting transmission in the respective pulse-transmission paths to said input circuits, a binary counter connected to inhibit said gating means in accordance with the output signal pattern of its stages for transmission to said input circuits of a binary group of test signals, and a logic circuit upon which is impressed the output signal of said system and the output signal pattern of said binary counter for producing a bistate output, the resulting output of said logic circuit either controlling advance of said counter for transmission to said input circuits of a different group of test signals or producing a failure signal whenever the output signal of the system and the concurrent output pattern of said binary counter produce a change in state of the output of said logic circuit.

5. An arrangement for testing a system having in series at least two groups of parallel-redundancy units having input and output circuits and in which the normal bistate input-output relation of one group is different from that of the other group which comprises means for generating test signals for transmission to said input circuits, switches respectively connected in the signal transmission paths to said input circuits, a binary counter connected to control said signal-generating means to produce a repeating sequence of binary-signal combinations simulating all significant input combinations and to control said switches for selective transmission of successive sequences of said signal combinations to different groups of said units, and a logic circuit upon which is impressed the output signal of the selected group of units and the output signal pattern of said binary counter, the resulting output of said logic circuit advancing said counter when of one state and producing a failure signal when of opposite state.

6. A system including circuit means affording voting-redundancy for high reliability in correlation of the input and output signals in combination with means for checking the system for failure in said circuit means and for location of failure permitting repair to restore voting-redundancy, said checking means including means for generating and applying to said system binary test-signal groups which simulate all possible significant input-signal combinations of said system, means for producing check signals respectively representing the proper state of the output signal of said system for each of the different test-signal groups, and means for producing a failure signal whenever the actual output signal of the system for an applied test-signal group is not the proper state as represented by the concurrent check signal.

7. A system including comparison means each having two inputs and a bistate output circuit, transducer means for applying to one input of each of said comparison means a signal normally corresponding with the actual magnitude of a condition, means for applying to the other input of each of said comparison means a signal normally corresponding with a predetermined magnitude of said condition, said output circuits each normally producing a binary signal whose state normally depends upon the relation of the actual magnitude of said condition to said predetermined magnitude, circuits for combining said binary signals to produce a binary output signal of state determined by the majority state of said binary signals, means for generating and applying to one of the aforesaid means binary test-signals of magnitude sufficient to change the state of the binary signals from said comparison means and in binary combinations including at least one combination which normally would change the state of said binary output signal and including at least one combination which normally would not change the state of said binary output signal, and means for producing a failure signal when the binary output signal does not correspond with that normally produced for the applied test-signal combination.

8. A system including comparison means each having two inputs and a bistate output circuit, transducer means for applying to one input of each of said comparison means a signal normally corresponding with the actual magnitude of a condition, means for applying to the other input of each of said comparison means a signal normally corresponding with a predetermined magnitude of said condition, said output circuits each normally producing a binary signal whose state normally depends upon the relation of the actual magnitude of said condition to said predetermined magnitude, circuits for combining said binary signals to produce a binary output signal of state determined by the majority state of said binary signals, means for generating and applying to one of the aforesaid means binary test-signals of magnitude sufficient to change the state of the binary signals except when the signal applied to a comparison means from the transducer means is zero and in binary combinations including at least one combination which normally would change the state of said binary output signal and including at least one combination which normally would not change the state of said binary output signal, and means for producing a failure signal when the binary output signal does not correspond with that normally produced for the applied test-signal combination.

9. A system including a group of transducer means normally producing for said system input signals corresponding with the actual magnitude of a condition, a group of set point means normally producing for said system input signals corresponding with a predetermined magnitude of said condition, a group of units for comparing the inputs of said transducer means with corresponding inputs of said set point means to produce binary signals of one state when the condition is below the set point and of opposite state when the condition is above the set point, circuit means combining said binary signals to produce a binary output signal of state determined by the majority state of said first-named binary signals, means for generating and applying to one of said groups binary test-signals of magnitude to change the state of said binary signal and in binary combinations including at least one combination which normally would change the state of said binary output signal and including at least one combination which normally would not change the state of said binary output signal, and means for producing a failure signal when the binary output signal does not correspond with that which should be produced for the applied test-signal combination.

10. A system including a current-responsive device which for normal conditions is continuously in one excitation state, circuit means having three bistate inputs and the state of whose output as normally determined by the majority state of said inputs determines the excitation state of said current-responsive device, means for generating and applying binary test pulses in simulation of all possible significant combinations of said bistate inputs, and means having a response time shorter than that of said device and responsive to change in excitation of said device during application of test-pulse combinations and responsive to said test-pulse combinations for indicating the inability of said circuit means to control the excitation of said current-responsive device in accordance with the majority state of said inputs.

11. A system including means having at least two bistate input circuits and a bistate output circuit whose state is normally predetermined by the concurrent states of the inputs, control means responsive to the bistate output of said first-named means to permit normal operation of the system for one output state and to provide emergency operation for the other output state pulse-programming means having outputs representative of test-pulse patterns to be applied to said means, pulsing means controlled by said programming means for producing said test-pulse patterns in simulation of all possible significant combinations of the bistate inputs of said first-named means, and means having a response time shorter than that of said control means and responsive to the output of said first-named means and to the outputs of said programming means to provide during said normal operation a signal indicating a failure in said first-named means or said pulsing means.

12. An arrangement for testing a system having a bistate output signal normally having correlation to the concurrent states of a plurality of input signals which comprises means for generating and applying to said system binary test-signal groups which simulate all possible significant input-signal combinations of said system,
means for concurrently producing check signals respectively representing the properly correlated state of the output signal of said system for each of the different test-signal groups, and
means for producing a failure signal whenever the actual output signal of the system for an applied test-signal group is not the state represented by the concurrently produced check signal, the failure signal controlling the first-named means for repeated application to the system of the test-signal group which revealed the failure,
said last-named means including indicators individual to units of the system and whose display identifies the location of a failure in the system.

13. An arrangement for testing a system having a bistate output signal normally having correlation to the concurrent states of a plurality of input signals which comprises means for generating and applying to said system binary test-signal groups which simulate all possible significant input-signal combinations of said system,
means for concurrently producing check signals respectively representing the properly correlated state of the output signal of said system for each of the different test-signal groups,
means for producing a failure signal whenever the actual output signal of the system for an applied test-signal group is not the state represented by the concurrently produced check signal and including indicators individual to units of the system and whose display identifies the location of a failure in the system, and
means for controlling said generating means and controlled by a failure signal to effect successive generation of the test-signal group which detected the failure and so obtain a persisting display by said unit indicators.

14. An arrangement for testing the reliability of a system including three or greater odd number of units each having binary input and output circuits, a combining circuit for combining the output signals of said units to produce a binary output signal of state determined by the majority state of said unit output signals, and control means responsive to the majority state of said unit output signals normally to permit continued operation of the system during testing thereof, said arrangement comprising means for generating and applying to said input circuits a sequence of test-pulse groups which simulate all possible significant binary input-signal combinations, the duration of individual test-pulse groups being less than the response time of said control means for testing of the reliability of said system without effect upon and during continued operation of the system,
means for producing concurrently with each test-pulse group a check signal representing the normal state of the binary output signal produced by said combining circuit for the corresponding input-signal combination,
comparison means for producing a failure signal whenever the actual output signal of the combining circuit resulting from application of a test-pulse group to the input circuits of said units does not correspond with the concurrently produced check signal, and
indicators individual to said units and whose display in response to the test-pulse groups identifies the location of a failed unit during continued operation of the system.

References Cited by the Examiner
UNITED STATES PATENTS 2,628,346  2/1953  Burkhart.
2,803,703  8/1957  Sherwin ___________ 340—176 X
3,034,051  5/1962  Higgins ____________ 324—73

NEIL C. READ, *Primary Examiner.*
ROBERT H. ROSE, *Examiner.*